United States Patent
Fujino et al.

(10) Patent No.: US 8,097,373 B2
(45) Date of Patent: *Jan. 17, 2012

(54) FUEL CELL POWER SUPPLY DEVICE

(75) Inventors: Takeshi Fujino, Wako (JP); Minoru Noguchi, Wako (JP); Eisuke Komazawa, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

This patent is subject to a terminal disclaimer.

(21) Appl. No.: 12/292,815

(22) Filed: Nov. 26, 2008

(65) Prior Publication Data

US 2009/0142634 A1 Jun. 4, 2009

(30) Foreign Application Priority Data

Nov. 29, 2007 (JP) ................................. 2007-309315

(51) Int. Cl.
*H01M 8/04* (2006.01)
(52) U.S. Cl. ............. 429/432; 429/9; 429/428; 429/430
(58) Field of Classification Search .............. 429/9, 428, 429/430–432
See application file for complete search history.

(56) References Cited

U.S. PATENT DOCUMENTS

| 6,684,135 B2 * | 1/2004 | Uenodai et al. ............ 180/65.31 |
| 7,315,771 B2 * | 1/2008 | Uenodai et al. ............. 180/65.8 |
| 7,436,148 B2 * | 10/2008 | Saeki et al. .................. 320/104 |
| 7,994,751 B2 * | 8/2011 | Noguchi et al. ............. 320/101 |

FOREIGN PATENT DOCUMENTS

| JP | 2004-014159 | 1/2004 |
| JP | 2004-312964 | 11/2004 |

* cited by examiner

*Primary Examiner* — Tho D Ta
(74) *Attorney, Agent, or Firm* — Squire, Sanders & Dempsey (US) LLP

(57) ABSTRACT

It is an object of the present invention to provide a fuel cell power supply device that can realize a reduction in size and improvement of durability of an accumulating unit while maintaining output performance that is applicable when large output is requested. The fuel cell power supply device includes: an output judging unit 31 that judges whether the output of a fuel cell 1 is equal to or higher than a predetermined level with respect to electric power requested by a load 5; and a power-supply controlling unit 30 that limits, when it is not judged that the output of the fuel cell 1 is equal to or higher than the predetermined level, the output of an accumulating unit 21 to be equal to or smaller than a first output limit value for allowing continuous output in first output time an limits, when it is judged that the output of the fuel cell 1 is equal to or higher than the predetermined level, within second output time shorter than the first output time, the output of the accumulating unit 21 to be equal to or smaller than a second output limit value, which is larger than the first output limit value, for allowing continuous output in the second output time.

15 Claims, 8 Drawing Sheets

FUEL CELL POWER SUPPLY DEVICE

BACKGROUND OF THE INVENTION

1. Field of the Invention

The present invention relates to a fuel cell power supply system that supplies electric power to a load using both a fuel cell and accumulating means such as a capacitor and a secondary battery.

2. Description of the Related Art

Conventionally, as a power source for a fuel cell vehicle, there is known a power source in which, for example, as shown in FIG. 8, a fuel cell 101 and a capacitor 102 (an electric double layer capacitor) are connected in parallel and this parallel circuit is connected to a driving motor 105 (a load) via a converter 103 and a PDU 4. There is proposed a fuel cell power supply device in which the output of the fuel cell 101 is supplemented with the output of the capacitor 102 when electric power requested by the driving motor suddenly increases (shift to large output in short time is requested), for example, during acceleration of the fuel cell vehicle (see, for example, Japanese Patent Application Laid-Open No. 2004-312964).

It is possible to reduce the number of cells forming a fuel cell stack and realize a reduction in size and cost of a fuel cell by supplementing the output of the fuel cell with the output of a capacitor in this way.

However, in the fuel cell power supply device disclosed in Japanese Patent Application Laid-Open No. 2004-312964, when it is attempted to increase the output of the capacitor, which supplements the output of the fuel cell, in order to secure driving power for the large-power driving motor, since it is necessary to increase the capacity of the capacitor, there is inconvenience in that the weight and the volume of the capacitor increase.

Therefore, in order to prevent this inconvenience, the loading weight and the volume of the capacitor are limited. Then, when shift to large output in short time is requested, for example, during acceleration of the fuel cell vehicle, there is inconvenience in that it is impossible to quickly respond to the request and acceleration performance falls (time for reaching target vehicle speed is long).

Therefore, in order to prevent this inconvenience, there is proposed a fuel cell power supply device in which, for example, as shown in FIG. 9, a fuel cell 201 and a capacitor 202 are connected in parallel, this parallel circuit is connected to a driving motor 206 via a PDU 205, accumulating means (a secondary battery) 203 is connected to the driving motor 206 via a converter 204 and the PDU 205, and the output of the fuel cell 201 and the capacitor 202 is supplemented with the output of the secondary battery 203 (see, for example, Japanese Patent Application Laid-Open No. 2004-14159). This makes it possible to realize a reduction in size and cost of a fuel cell and control the weight and the volume of a capacitor.

However, in the fuel cell battery device disclosed in Japanese Patent Application Laid-Open No. 2004-14159, when it is attempted to increase the output of the secondary battery, which supplements the output of the fuel cell and the capacitor, in order to secure the driving power to the high-power driving motor, it is necessary to increase a loading amount or increase the power density of the secondary battery.

When the secondary battery is set to high power density (e.g., equal to or higher than 3000 w/kg), since an electrode area increases, there is inconvenience in that the size of the secondary battery and the volume of the secondary battery increase. Therefore, in order to prevent this inconvenience, the power density of the secondary battery is reduced (e.g., about 2000 w/kg) to realize a reduction in size of the secondary battery, a margin of the output performance of the secondary battery is lost. As a result, when large output is requested, driving is continued near an output performance limit of the secondary battery and deterioration in durability of the secondary battery due to heat generation is likely to be caused.

SUMMARY OF THE INVENTION

The present invention has been devised in view of the background and it is an object of the present invention to provide a fuel cell power supply device that can realize a reduction in size and improvement of durability of accumulating means while maintaining output performance that is applicable when large output is requested.

The present invention relates to improvement of a fuel cell power supply device including: a fuel cell; an accumulating means; a first step-up and step-down means, an input section of which is connected to the fuel cell and an output section of which is connected to a load, the first step-up and step-down means steps up or steps down voltage inputted to the input section and supplies electric power generated by the stepped-up or stepped-down voltage to the load; a second step-up and step-down means, an input section of which is connected to the accumulating means and an output section of which is connected to the load, the second step-up and step-down means steps up or steps down voltage inputted to the input section and supplies electric power generated by the stepped-up or stepped-down voltage to the load; and a power-supply controlling means for controlling operation of the first and second step-up and step-down means according to electric power requested by the load and controlling power supply from the fuel cell to the load and power supply from the accumulating means to the load.

A fuel cell power supply device according to an aspect of the present invention includes an output judging means for judging whether the output of the fuel cell is equal to or higher than a predetermined level. The power-supply controlling means limits, when it is not judged by the output judging means that the output of the fuel cell is equal to or higher than the predetermined level, the output of the accumulating means to be equal to or smaller than a first output limit value for allowing continuous output in first output time and limits, when it is judged by the output judging means that the output of the fuel cell is equal to or higher than the predetermined level, within second output time shorter than the first output time, the output of the accumulating means to be equal to or smaller than a second output limit value, which is larger than the first output limit value, for allowing continuous output in the second output time.

According to the aspect of the present invention, a reduction in size of the fuel cell is realized by supplementing, using the power-supply controlling means, power supply from the fuel cell to the load with power supply from the accumulating means to the load. It is judged by the output judging means whether the output of the fuel cell is equal to or higher than the predetermined level. The predetermined level is set not to exceed, for example, an upper limit of a steady output range of the fuel cell.

When it is judged by the output judging means that the output of the fuel cell is equal to or higher than the predetermined level, the power-supply controlling means limits the output of the accumulating means to be equal to or smaller than the second output limit value larger than the first output limit value. In other words, when the output of the fuel cell increases, the power-supply controlling means relaxes the output limit for the accumulating means to prevent power shortage when large output is requested. Since the output limit for the accumulating means is relaxed in this way, it is possible to maintain output performance applicable to a request from the load even if the capacity of the accumulating means is reduced.

Further, the power supply controlling means limits heat generation of the accumulating means by limiting the relaxation of the output limit for the accumulating means to be performed within the second output time in which continuous output is allowed. Therefore, it is possible to suppress deterioration of the accumulating means due to heat generation and realize improvement of durability of the accumulating means.

A fuel cell power supply device according to a second aspect of the present invention includes an output judging means for judging whether electric power requested by the load is equal to or higher than a predetermined level. The power supply controlling means limits, when it is not judged by the output judging means that the requested electric power is equal to or higher than the predetermined level, the output of the accumulating means to be equal to or smaller than a first output limit value for allowing continuous output in first output time and limits, when it is judged by the output judging means that the requested electric power is equal to or higher than the predetermined level, within second output time shorter than the first output time, the output of the accumulating means to be equal to or smaller than a second output limit value, which is larger than the first output limit value, for allowing continuous output in the second output time.

According to the aspect of the present invention, when it is judged by the output judging means that electric power requested by the load is equal to or higher than the predetermined level, the output of the fuel cell is controlled to be equal to or higher than the predetermined level by the power supply controlling means. In this case, the power supply controlling means relaxes the output limit for the accumulating means to prevent power shortage when large output is requested. Since the output limit for the accumulating means is relaxed in this way, it is possible to maintain output performance applicable to a request from the load even if the capacity of the secondary battery is reduced.

Further, the power supply controlling means limits heat generation of the accumulating means by limiting the relaxation of the output limit for the accumulating means within the second output time in which continuous output is allowed. Therefore, it is possible to suppress deterioration of the secondary battery due to heat generation and realize improvement of durability of the accumulating means.

A fuel cell power supply device according to a third aspect of the present invention includes an output judging means for judging whether a rate of rise of electric power requested by the load is equal to or higher than a predetermined level. The power supply controlling means limits, when it is not judged by the output judging means that the rate of rise of the requested electric power is equal to or higher than the predetermined level, the output of the accumulating means to be equal to or smaller than a first output limit value for allowing continuous output in first output time and limits, when it is judged by the output judging means that the rate of rise of the requested electric power is equal to or higher than the predetermined level, within second output time shorter than the first output time, the output of the accumulating means to be equal to or smaller than a second output limit value, which is larger than the first output limit value, for allowing continuous output in the second output time.

According to the aspect of the present invention, it is judged by the output judging means whether a rate of rise of electric power requested by the load is equal to or higher than the predetermined level. When it is judged by the output judging means that the rate of rise of the requested electric power is equal to or higher than the predetermined level, an increase in the output of the fuel cell cannot follow the sudden increase in the requested electric power and power shortage occurs. Therefore, in this case, the power supply controlling means relaxes the output limit for the secondary battery to prevent power shortage when the requested electric power suddenly increases. Since the output limit for the secondary battery is relaxed in this way, it is possible to maintain output performance applicable to a request from the load even if the capacity of the secondary battery is reduced.

Further, the power supply controlling means limits heat generation of the accumulating means by limiting the relaxation of the output limit for the accumulating means to be performed within the second output time in which continuous output is allowed. Therefore, it is possible to suppress deterioration of the secondary battery due to heat generation and realize improvement of durability of the accumulating means.

In the fuel cell power supply device according to the present invention, preferably, the accumulating means includes a secondary battery. The secondary battery refers to a chemical battery that converts energy into DC power with a chemical reaction.

According to the present invention, since the secondary battery has relatively high energy density, it is possible to further reduce, by using the secondary battery as the accumulating means, the size of the fuel cell power supply device while supplementing the output of the fuel cell.

Preferably, the fuel cell power supply device according to the present invention is mounted on a vehicle and the load is a motor serving as a power source for the vehicle.

According to the present invention, it is possible to realize, by supplementing power supply to the motor by the fuel cell with power supply by the accumulating means, a reduction in size and improvement of durability of the accumulating means while maintaining output performance applicable during acceleration of the vehicle when shift to large output in short time is requested.

In the fuel cell power supply device according to the present invention, preferably, the motor is coupled to an axle of the vehicle and operates as a generator to output regenerated power during deceleration of the vehicle, the fuel cell power supply device includes: a capacitor connected in parallel to the fuel cell; and a charging executing means for controlling the operation of the first and second step-up and step-down means and executing first charging for supplying the regenerated power to the capacitor via the first step-up and step-down means and second charging for supplying the regenerated power to the accumulating means via the second step-up and step-down means, and the charging executing means charges, when the power supply controlling means limits the output of the accumulating means to be equal to or smaller than the second limit value and performs power supply from the accumulating means to the load, after the power supply is finished, the accumulating means to a predetermined upper limit level using the second charging and then executes the first charging.

In the present invention, improvement of output response performance and a reduction in size of the fuel cell are realized by supplementing the output of the fuel cell with the output from the capacitor. The capacitor and the accumulating means are charged with the regenerated power of the motor by the charging executing means. When the output limit for the accumulating means is relaxed from the first output limit value to the second output limit value by the power supply controlling means and power supply from the accumulating means to the load is performed by power supply controlling means, a discharge amount of the accumulating means increases. Therefore, when the power supply is finished, a residual state of charge of the accumulating means is considered to substantially decrease.

Therefore, the charging executing means charges, after the power supply is finished, the charging means to the predetermined upper limit level using the first charging and then executes the second charging. This makes it possible to quickly recover a charge amount of the accumulating means and prepare for an increase in the power supply to the load after that.

Preferably, the fuel cell power supply device according to the present invention includes a state-of-charge judging means for judging whether a state of charge of the accumulating means is equal to or lower than a predetermined lower limit level, and the charging executing means limits, when it is not judged by the state-of-charge judging means that the state of charge of the accumulating means is equal to or lower than the predetermined lower limit level, the input to the accumulating means to be equal to or smaller than a first input limit value for allowing continuous input in first input time and limits, when it is judged by the state-of-charge judging means that the state of charge of the accumulating means is equal to or lower than the predetermined lower limit level, within second input time shorter than the first input time, the input to the accumulating means to be equal to or smaller than a second input limit value, which is larger than the first input limit value, for allowing continuous input in the second input time.

In the present invention, when it is judged by the state-of-charge judging means that the state of charge of the accumulating means is equal to or lower than the predetermined lower limit level, the charging executing means limits the input to the accumulating means to be equal to or smaller than the second input limit value larger than the first input limit value. In other words, when a residual state of charge of the accumulating means substantially decreases, the charging executing means can relax the input limit for the secondary battery and prepare for an increase in requested electric power after that.

Further, the charging executing means limits heat generation of the accumulating means by limiting the relaxation of the input limit for the accumulating means to be performed within the second input time in which continuous input is allowed. Therefore, it is possible to suppress deterioration of the secondary battery due to heat generation and realize improvement of durability of the accumulating means.

DETAILED DESCRIPTION OF THE PREFERRED EMBODIMENT

First Embodiment

Figure 1:
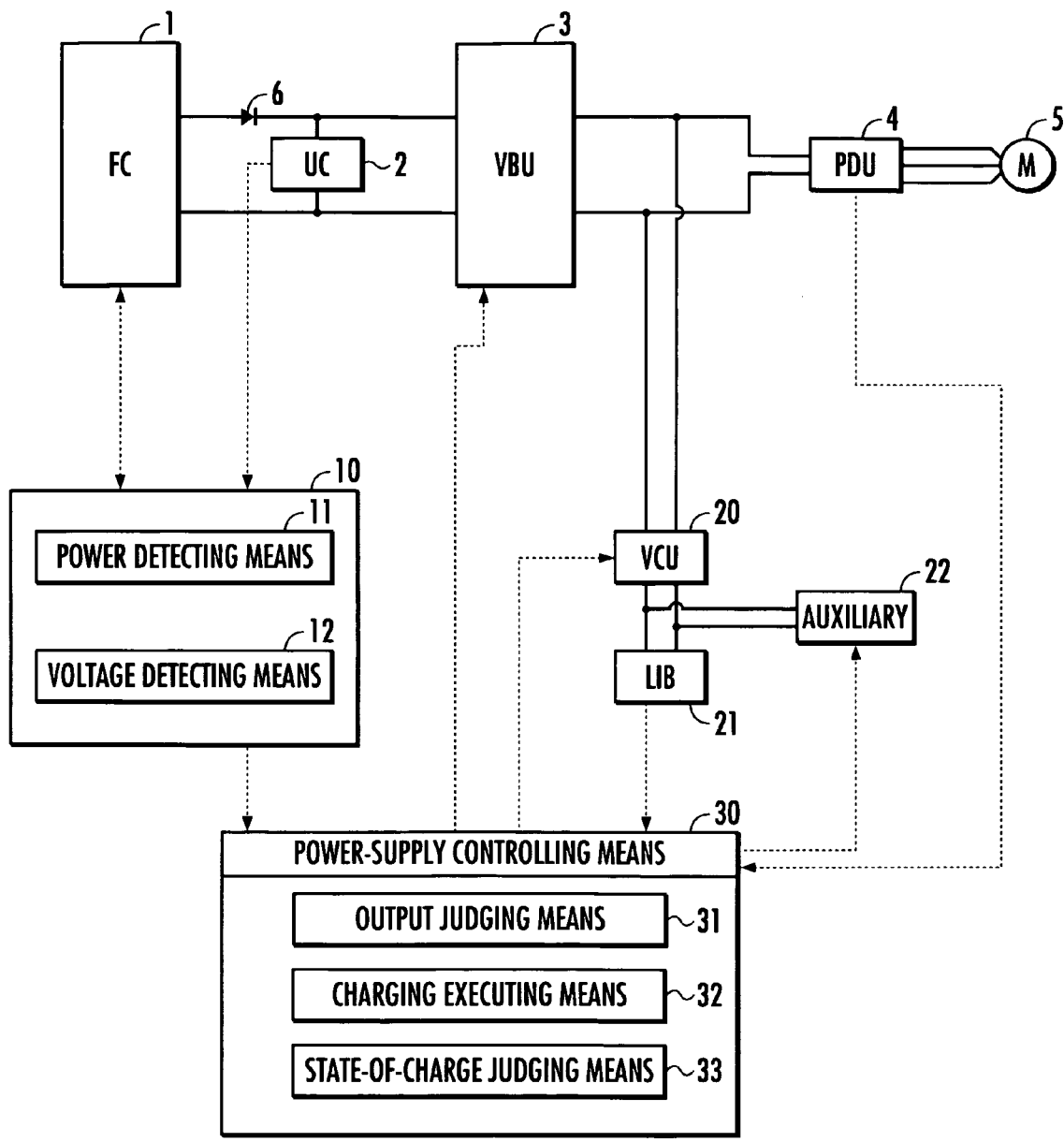
FIG. 1 is an overall diagram of a fuel cell power supply device according to an embodiment of the present invention.
Figure 2:
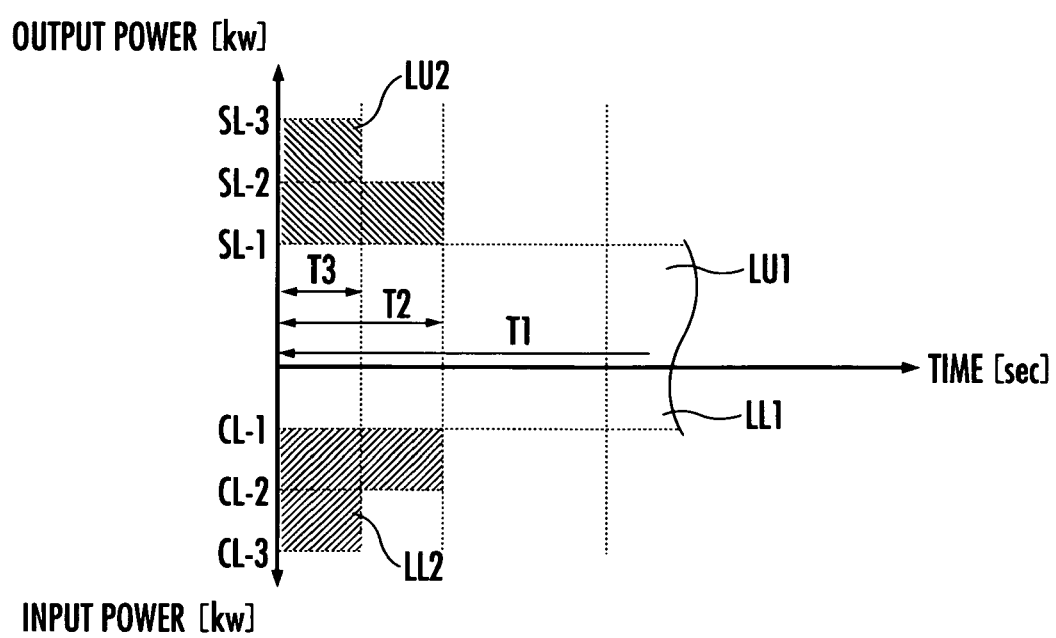
FIG. 2 is a diagram of an example of an input and output limit map showing a relation between an output limit value and an input limit value and output time and input time by the fuel cell power supply device shown in FIG. 1.
Figure 3:
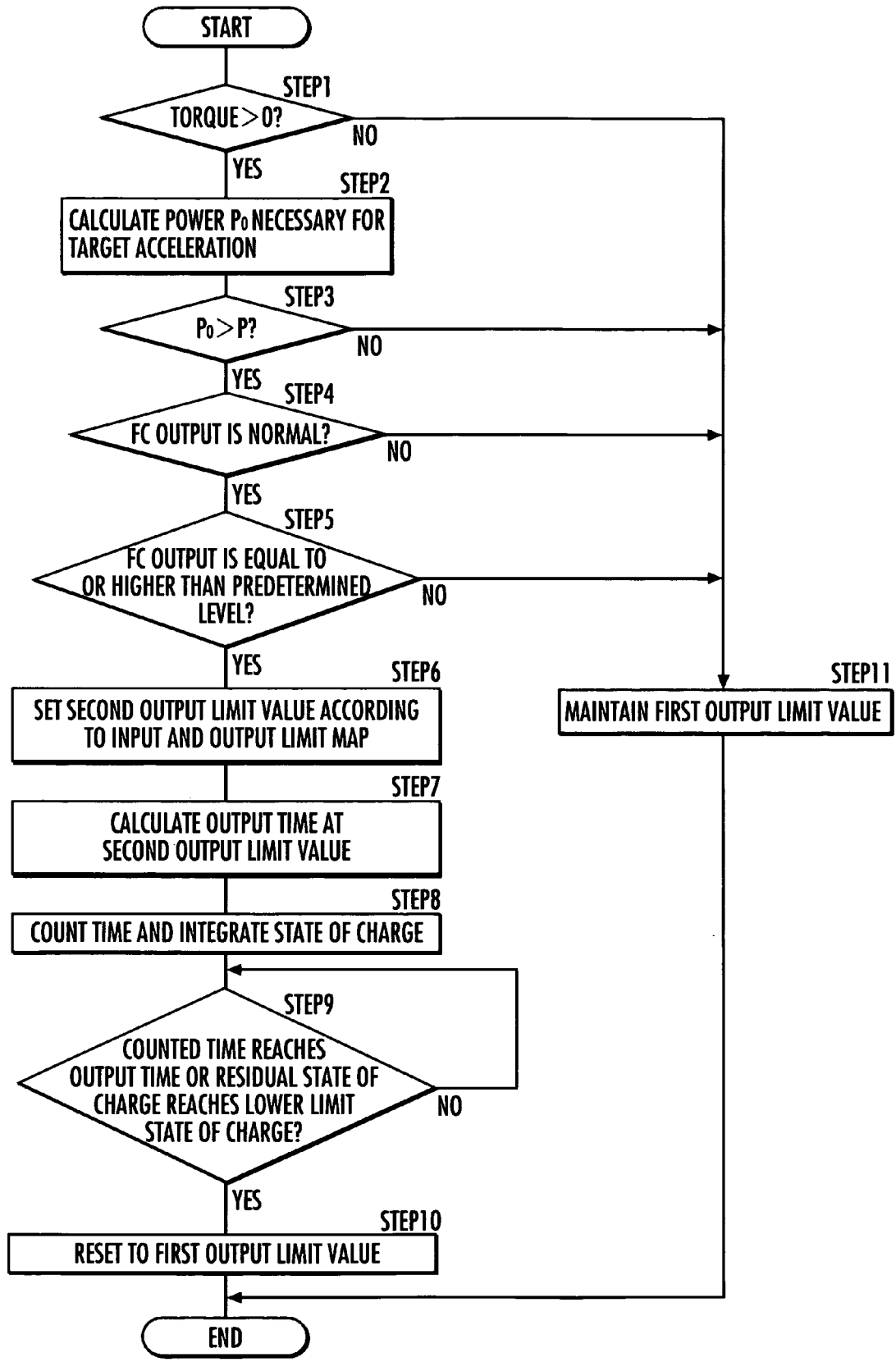
FIG. 3 is a flowchart of processing for switching an output limit value of a secondary battery in the fuel cell power supply device shown in FIG. 1.
Figure 4:
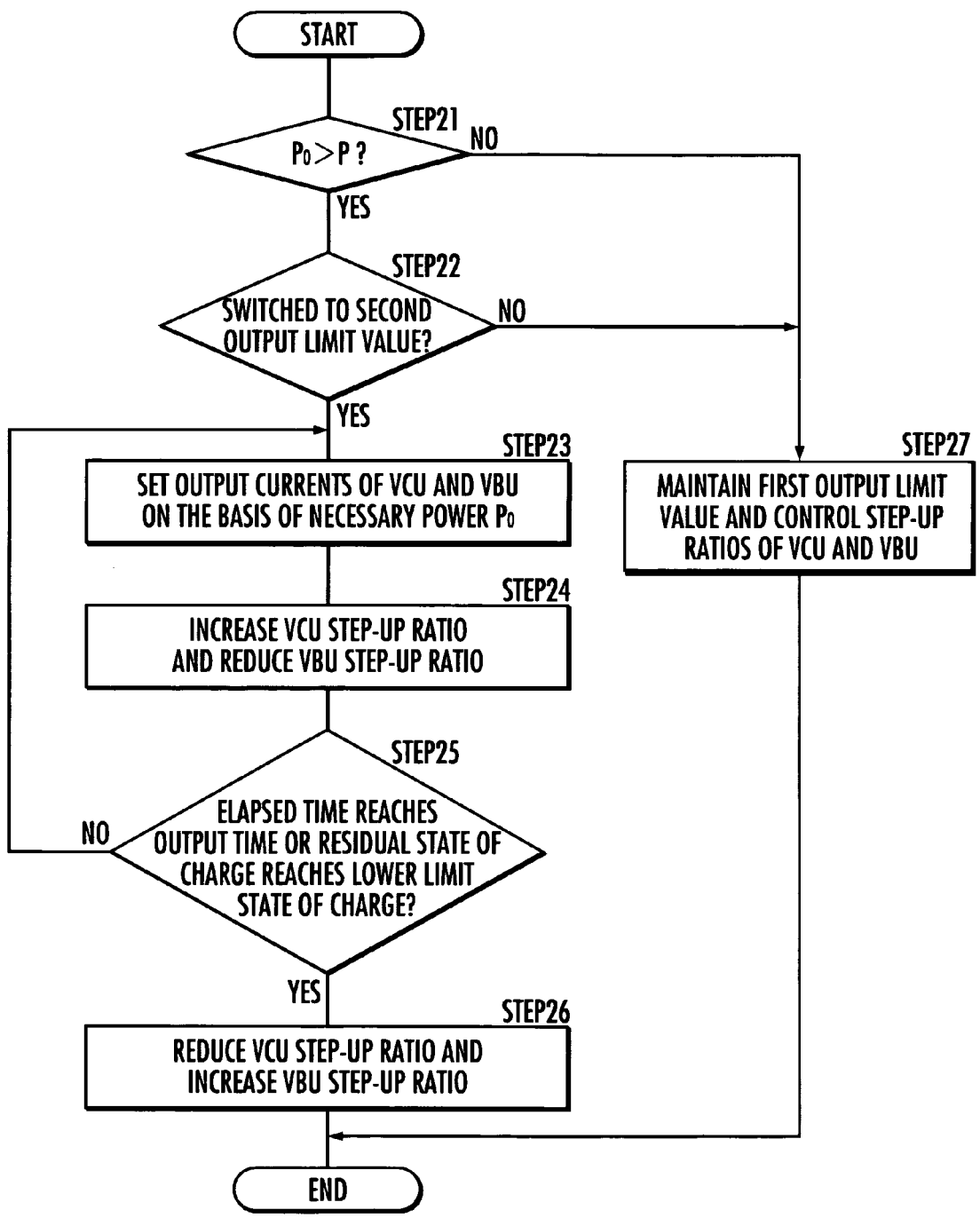
FIG. 4 is a flowchart of operation of first and second step-up and step-down means corresponding to the switching of the output limit value in the fuel cell power supply device shown in FIG. 1.
Figure 5:
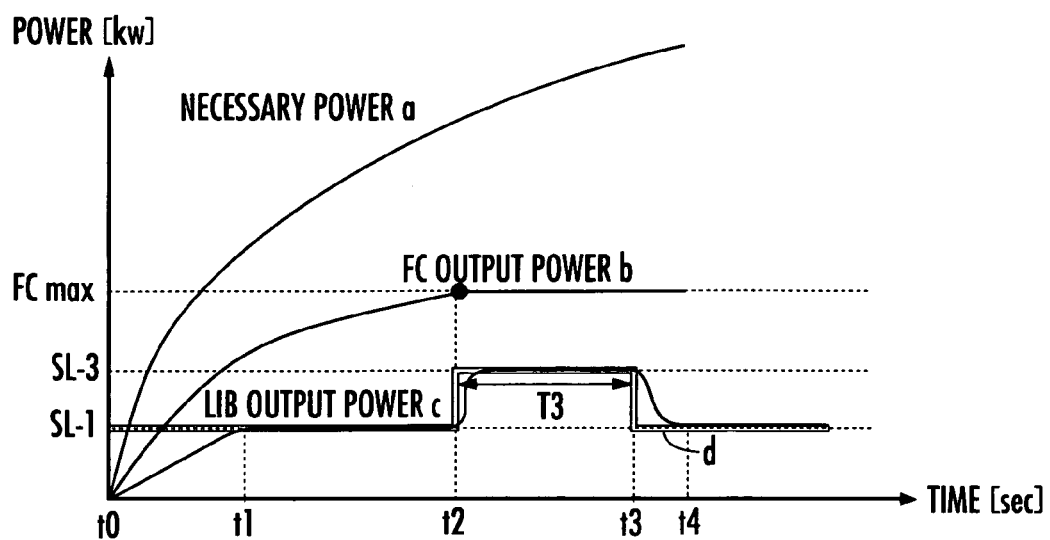
FIG. 5 is a graph of a temporal change in power supply by the fuel cell power supply device shown in FIG. 1.
Figure 6:
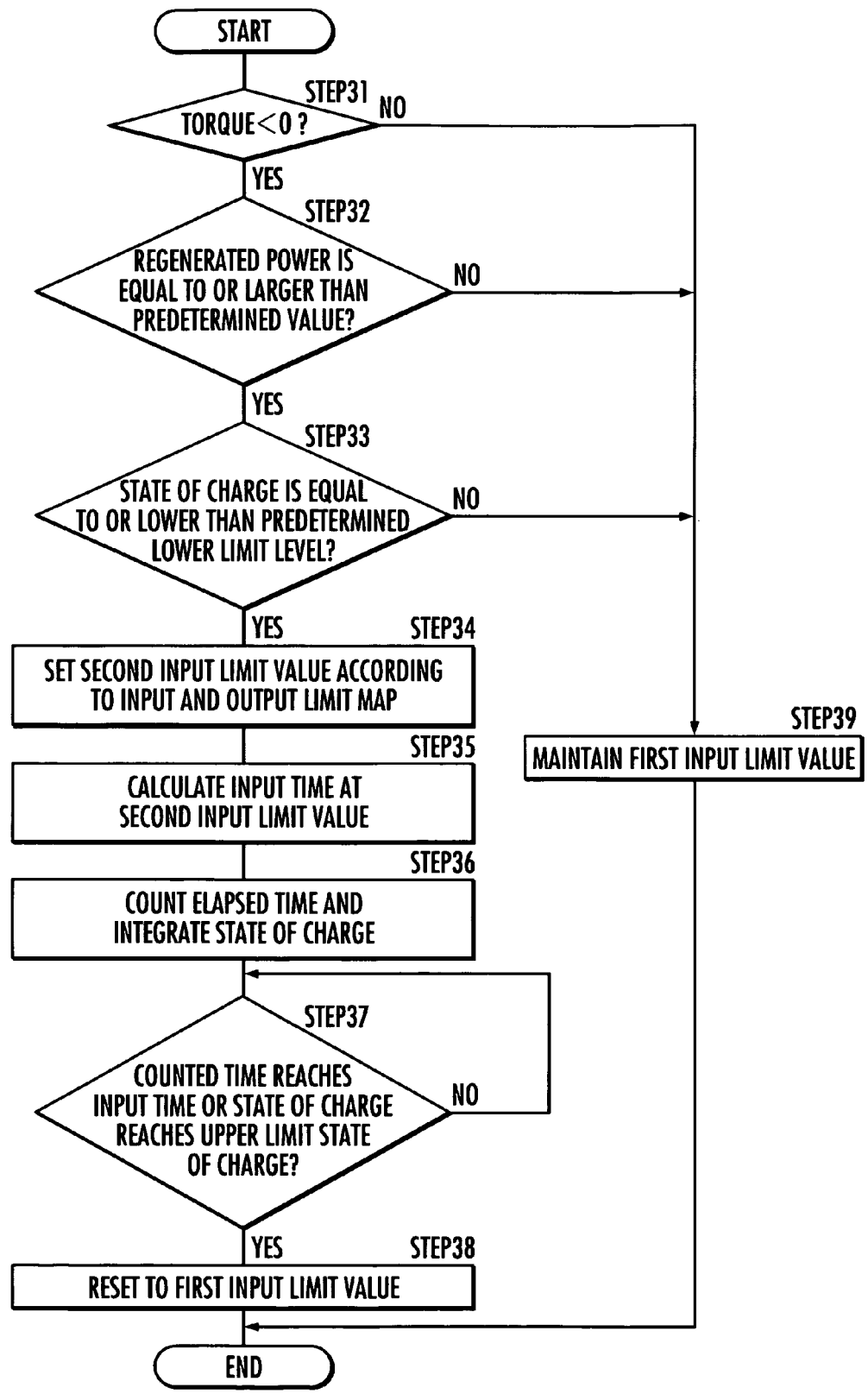
FIG. 6 is a flowchart of processing for switching an input limit value of the secondary battery in the fuel cell power supply device shown in FIG. 1.

A first embodiment of the present invention is explained below with reference to FIGS. 1 to 6. FIG. 1 is an overall diagram of a fuel cell power supply device according to this embodiment. FIG. 2 is a diagram of an example of an input and output limit map showing a relation between an output limit value and an input limit value and output time and input time of a secondary battery by the fuel cell power supply device shown in FIG. 1. FIG. 3 is a flowchart of processing for switching the output limit value of the secondary battery in the fuel cell power supply device shown in FIG. 1. FIG. 4 is a flowchart of operation of first and second step-up and step-down means in the fuel cell power supply device shown in FIG. 1. FIG. 5 is a graph of a temporal change in power supply by the fuel cell power supply device shown in FIG. 1. FIG. 6 is a flowchart of processing for switching an input limit value of the secondary battery in the fuel cell power supply device shown in FIG. 1.

Referring to FIG. 1, the fuel cell power supply device according to this embodiment is mounted on a fuel cell vehicle (corresponding to the vehicle of the present invention). The fuel cell power supply device includes a fuel cell 1, an electric double layer capacitor 2 (hereinafter simply referred to as capacitor 2) connected in parallel to the fuel cell 1, first step-up and step-down means 3 (VBU, Voltage Boost Unit), an input section of which is connected to the fuel cell 1 and the capacitor 2 and an output section of which is connected to a motor 5 (corresponding to the load of the present invention) via a PDU (Power Drive Unit) 4, and second step-up and step-down means 20 (VCU, Voltage Conversion Unit), an input section of which is connected to the VBU 3 and an output section of which is connected to a secondary battery 21 (in this embodiment, a lithium ion battery is used). The motor 5 is coupled to an axle of the vehicle and functions as a power source for the vehicle. Further, the motor 5 operates as a generator and outputs regenerated power during deceleration of the vehicle.

The fuel cell 1 is configured by connecting, for example, two-hundred fifty fuel cell stacks in series. The output voltage of the fuel cell 1 fluctuates in a range of about 225 V (an output current of 0 A) to 180 V (an output current of 300 A). The capacitor 2 is an electric double layer capacitor. An output voltage of the capacitor 2 fluctuates, for example, in a range around 200 V (in a range of about a lower limit of 154 V to an upper limit of 243 V). The output voltage of the secondary battery 21 fluctuates, for example, in a range of about 290 V to 350 V.

The VBU 3 is a DC/DC converter (an up converter) having a step-up function (e.g., a step-up ratio of 1.5 to 2.4 at rated power of 100 kW). The boosting means 3 has at least a step-up function. The VCU 20 is a DC/DC converter of a step-up and step-down type having a step-up function and a step-down function (e.g., a step-up ratio of 1.36 to 1.70 at rated power of 10 kW). The PDU 4 has an inverter function for converting DC voltage into three-phase AC voltage and outputting the voltage to the motor 5.

An auxiliary 22 such as a pump for supplying the air as a reactive gas to the fuel cell 1 is connected to the secondary battery 21. A diode 6 for prohibiting inflow of an electric current into the fuel cell 1 is connected between the fuel cell 1 and the VBU 3 and the capacitor 2. The inflow of an electric current into the fuel cell 1 may be prohibited by using another rectifying device such as a transistor rather than the diode or connecting the capacitor 2 to the fuel cell 1 via step-down means (a down converter).

Further, the fuel cell power supply device includes fuel-cell controlling means 10 for controlling the operation of the fuel cell 1 and power-supply controlling means 30 for controlling the operation of the VBU 3 and the VCU 20 to perform power supply from the fuel cell 1, the capacitor 2, and the secondary battery 21 to the motor 5 and charging of the capacitor 2 and the secondary battery 21.

The fuel-cell controlling means 10 and the power-supply controlling means 30 are configured by causing a microcomputer (not shown) to execute a control program for the fuel cell power supply device. The fuel-cell controlling means 10 is connected to not-shown various sensors included in the fuel cell 1 and not-shown various sensors included in the capacitor 2. The fuel-cell controlling means 10 is inputted with detection signals outputted from these sensors and detects operation states of the fuel cell 1 and the capacitor 2.

The power-supply controlling means 30 is inputted with detection signals of input voltages, input currents, output voltages, and output currents of the VBU 3 and VCU 20 detected by a not-shown voltage sensor and a not-shown current sensor. The power-supply controlling means 30 is connected to not-shown various sensors (a temperature sensor, a voltage sensor, etc.) included in the secondary battery 21. The power-supply controlling means 30 is inputted with detection signals outputted from these sensors and detects an operation state of the secondary battery 21.

Power detecting means 11 included in the fuel-cell controlling means 10 detects, according to detection signals of a voltage sensor and a current sensor (not shown) included in the fuel cell 1 and detection signals of a voltage sensor and a current sensor (not shown) included in the capacitor 2, electric power outputted from the fuel cell 1 and electric power outputted from the capacitor 2. The voltage detecting means 12 detects, according to a detection signal of the voltage sensor included in the fuel cell 1, an output voltage of the fuel cell 1.

The power-supply controlling means 30 controls the operation of the VBU 3 and the VCU 20 to control power supply from the fuel cell 1 and the capacitor 2 to the motor 5 and power supply from the secondary battery 21 to the motor 5.

Specifically, when the vehicle starts to run in a state in which the fuel cell 1 is stopped, first, the power-supply controlling means 30 drives the motor 5 using output power of the capacitor 2 and output power of the secondary battery 21. At the same time, the power-supply controlling means 30 starts operation of the auxiliary 22 using output power of the secondary battery 21. When the supply of the reactive gas to the fuel cell 1 is started and the fuel cell 1 is started up by the operation of the auxiliary 22, the power-supply controlling means 30 supplies output power of the fuel cell 1 to the motor 5. Thereafter, in a state in which the motor 5 is operating in a low load state, for example, when the vehicle is running on a flat road, the power-supply controlling means 30 drives the motor 5 mainly using the output power of the fuel cell 1.

When power supply to the motor 5 is insufficient with only the output power from the fuel cell 1 and the capacitor 2, the power-supply controlling means 30 supplies the output power of the secondary battery 21 to supplement the power supply to the motor 5. This occurs in a state in which the motor 5 is operating in a high load state, for example, when the vehicle is running on a hill climbing road and in a state in which shift to large output in short time is requested, for example, during acceleration of the vehicle.

Further, the power-supply controlling means 30 includes charging executing means 32 for controlling operation of the VBU 3 and the VCU 20 to execute charging of the capacitor 2 and charging of the secondary battery 21.

Specifically, the charging executing means 32 controls operation of the VBU 3 and the VCU 20 during deceleration of the vehicle to execute first charging for supplying regenerated power generated in the motor 5 to the capacitor 2 via the VBU 3 and second charging for supplying the regenerated power generated in the motor 5 to the secondary battery 21 via the VCU 20.

The charging executing means 32 detects the regenerated power of the motor 5 using a voltage sensor and a current sensor included in the PDU 4. When the regenerated power of the motor 5 is small, for example, when the vehicle is gently decelerating, the charging executing means 32 sets the VBU 3 in a direct-coupled (through) state and executes only the first charging to the capacitor 2. When the regenerated power of the motor 5 is large, for example, when the vehicle decelerates from a high-speed running state (suddenly decelerates), the charging executing means 32 distributes the regenerated power of the motor 5 and executes both the first charging and the second charging.

When the vehicle stops, the charging executing means 32 supplies electric power from the fuel cell 1 to the secondary battery 21 via the VBU 3 and the VCU 20 and charges the secondary battery 21. When the running vehicle stops, the motor 5 stops and the output power of the fuel cell 1 decreases. According to the decrease in the output power, the output voltage of the fuel cell 1 rises. Therefore, when the output voltage of the fuel cell 1 detected by the voltage detecting means 12 rises to be equal to or higher than predetermined voltage set in advance and the output of the fuel cell 1 has a margin, the charging executing means 32 charges the secondary battery 21 via the VBU 3 and the VCU 20.

Further, the power-supply controlling means 30 includes output judging means 31 for judging whether the output of the fuel cell 1 is equal to or higher than a predetermined level. The judgment on whether the output is equal to or higher than the predetermined level is performed to judge when an acceleration request for the vehicle is large (specifically, when a requested load of the motor 5 is equal to or larger than 30 kw or is equal to or larger than 50% of the maximum output of the fuel cell 1).

The power-supply controlling means 30 limits the output of the secondary battery 21 according to a judgment result of the output judging means 31. For example, the predetermined level is set not to exceed an upper limit of a stead output range of the fuel cell 1.

Moreover, the power-supply controlling means 30 includes state-of-charge judging means 33 for judging whether a state of charge of the secondary battery 21 is equal to or smaller than a predetermined lower limit level. The charging executing means 32 limits the input to the secondary battery 21 according to a judgment result of the state-of-charge judging means 33. For example, the predetermined lower limit level is set not to be lower than a lower limit of a steady input range of the secondary battery 21. A state of charge (SOC) of the secondary battery 21 is estimated on the basis of a relation between a state of charge and an open circuit voltage using the voltage of the secondary battery 21.

Output limit and input limit for the secondary battery 21 are explained with reference to an input and output limit map shown in FIG. 2. In FIG. 2, the ordinate indicates output power (during discharge) and input power (during charging) [kw] and the abscissa indicates output time (during discharge) and input time (during charging) [sec]. An area in which electric power is positive indicates a relation between an output limit value and output time for allowing continuous output at the output limit value. An area in which electric power is negative indicates a relation between an input limit value and input time for allowing continuous input at the input limit value.

When it is not judged by the output judging means 31 that the output of the fuel cell 1 is equal to or higher than the predetermined level, the power-supply controlling means 30 sets, on the basis of the input and output limit map, the output limit value of the secondary battery 21 to SL-1 (corresponding to the first output limit value of the present invention) for allowing continuous output at T1 (corresponding to the first output time of the present invention) (a range LU1 shown in FIG. 2).

When it is judged that fixed or longer time is required to increase the output of the fuel cell 1, the power-supply controlling means 30 may change the output limit value of the secondary battery 21 to a value for allowing continuous output.

When it is judged by the output judging means 31 that the output of the fuel cell 1 is equal to or higher than the predetermined level, the power-supply controlling means 30 sets the output limit value of the secondary battery 21 to SL-3 (corresponding to the second output limit value of the present invention) for allowing continuous output at T3 (corresponding to the second output time of the present invention) (a range LU2 shown in FIG. 2).

The power-supply controlling means 30 may set, for example, according to electric power requested by the motor 5, the output limit value of the secondary battery 21 to another value (e.g., SL-2 for allowing continuous output at T2) included in the range LU2 instead of T3 and SL-3. For example, T1 is set to sufficiently long time equal to or longer than 20 [sec], T2 is set to 10 [sec], and T3 is set to 5 [sec].

When it is not judged by the state-of-charge judging means 33 that the state of charge of the secondary battery 21 is equal to or lower than the predetermined lower limit level, the charging executing means 32 sets, on the basis of the input and output limit map, the input limit value of the secondary battery 21 to CL-1 (corresponding to the first input limit value of the present invention) for allowing continuous input at T1 (corresponding to the first input time of the present invention) (a range LL1 shown in FIG. 2).

When it is judged by the state-of-charge judging means 33 that the state of charge of the secondary battery 21 is equal to or lower than the predetermined lower limit level, the charging executing means 32 sets the input limit value of the secondary battery 21 to CL-3 (corresponding to the second input limit value of the present invention) for allowing continuous input at T3 (corresponding to the second input time of the present invention) (a range LL2 shown in FIG. 2).

The charging executing means 32 may set, for example, according to electric power requested by the motor 5, the input limit value of the secondary battery 21 to another value (e.g., CL-2 for allowing continuous input at T2) included in the range LL2 instead of T3 and CL-3.

When the power-supply controlling means 30 limits the output of the secondary battery 21 to be equal to or smaller than the second limit value and performs power supply from the secondary battery 21 to the motor 5 as explained above, after the power supply is finished, first, the charging executing means 32 executes only the second charging to the secondary battery 21. The charging executing means 32 supplies the entire regenerated power to the secondary battery 21 via the VCU 20 and charges the secondary battery 21 to a predetermined upper limit level using the second charging.

The predetermined upper limit level is set not to exceed, for example, an upper limit of the steady input range of the secondary battery 21. The charging executing means 32 charges the secondary battery 21 to the predetermined upper limit level using the second charging and then executes the first charging to the capacitor 2.

(1) Output Limit for the Secondary Battery

Processing for switching the output limit value of the secondary battery 21 in the fuel cell power supply device according to this embodiment is explained with reference to a flowchart shown in FIG. 3. The processing is performed when power supply from the secondary battery 21 to the motor 5 is performed during acceleration of the vehicle. The processing is sequentially executed periodically at predetermined timing.

In the following explanation, it is assumed that, as an initial state, the output limit value of the secondary battery 21 is set to the first output limit value (SL-1 in the input and output limit map shown in FIG. 2). The output time at SL-1 is T1. For example, time until the state of charge of the secondary battery 21 reaches a lower limit state of charge with the output equal to or smaller than SL-1 can be set as T1.

First, in STEP 1, the power-supply controlling means 30 judges whether the torque of the motor 5 is equal to or larger than 0. When the torque of the motor 5 is larger than 0, the vehicle is accelerating. According to the judgment, it is detected that the vehicle is in an acceleration state. When a judgment result in STEP 1 is NO (the torque is equal to or smaller than 0), the processing proceeds to STEP 11. The output limit value is maintained at SL-1, the output of the secondary battery 21 is controlled to be equal to or smaller than SL-1, and the processing for switching the output limit value is finished.

When the judgment result in STEP 1 is YES (the torque is larger than 0), the processing proceeds to STEP 2. The power-supply controlling means 30 calculates electric power P0 [kw] necessary for driving the motor 5 (electric power requested by the motor 5) in order to realize target acceleration from a state of the vehicle (vehicle speed and acceleration) with respect to target acceleration of the vehicle set by a driver of the vehicle.

In STEP 3, the power-supply controlling means 30 acquires actual output P (a sum of present output power supplied from the fuel cell 1, the capacitor 2, and the secondary battery 21 to the motor 5) and judges whether the acquired necessary power P0 is larger than the actual output P. When a judgment result in STEP 3 is NO (the necessary power P0 is equal to or smaller than the actual output P), the processing proceeds to STEP 11. The output limit value is maintained at SL-1, the output of the secondary battery 21 is controlled to be equal to or smaller than SL-1, and the processing for switching the output limit value is finished.

When the judgment result in STEP 3 is YES (the necessary power P0 is larger than the actual output P), the processing proceeds to STEP 4. The power-supply controlling means 30 judges whether the output of the fuel cell 1 is normal. Specifically, the power-supply controlling means 30 performs the judgment on the basis of, for example, whether the output of the fuel cell 1 is within a proper range or whether current speed of the fuel cell 1 is within a proper range. For example, the power-supply controlling means 30 judges whether the output of the fuel cell 1 is within a predetermined range (e.g., 30% to 100% of a steady output range of the fuel cell 1).

When a judgment result in STEP 4 is NO (the output of the fuel cell 1 is not normal), for example, it is likely that misdetection of the output of the fuel cell 1 occurs. Therefore, in this case, the processing proceeds to STEP 11. The output limit value is maintained at SL-1, the output of the secondary battery 21 is controlled to be equal to or larger than SL-1, and the processing for switching the output limit value is finished.

When the judgment result in STEP 4 is YES (the output of the fuel cell 1 is normal), the processing proceeds to STEP 5. The output judging means 31 judges whether the output of the fuel cell 1 is equal to or higher than a predetermined level (e.g., 50 [kw]). When a judgment result in STEP 5 is NO (the output of the fuel cell 1 is not equal to or higher than the predetermined level), the processing proceeds to STEP 11. The output limit value is maintained at SL-1, the output of the secondary battery 21 is controlled to be equal to or smaller than SL-1, and the processing for switching the output limit value is finished.

When the judgment result in STEP 5 is YES (the output of the fuel cell 1 is equal to or higher than the predetermined level), the processing proceeds to STEP 6. The power-supply controlling means 30 switches the output limit value of the secondary battery 21 to SL-3 (the second output limit value) in the input and output limit map shown in FIG. 2.

In STEP 7, the power-supply controlling means 30 sets, with reference to the input and output limit map, output time T3 for allowing output at SL-3 set in STEP 6. The power-supply controlling means 30 corrects T3 on the basis of the temperature of the secondary battery 21 such that, for example, output time is shorter as the present temperature is higher than reference temperature set in advance.

The power-supply controlling means 30 may sequentially calculate the output time T3 from the temperature of the secondary battery 21, upper limit temperature corresponding to a range for not spoiling durability of the secondary battery 21, and a heat generation predicted amount in continuous output at SL-3 set in STEP 6.

The processing proceeds to STEP 8. The power-supply controlling means 30 counts elapsed time after the output is switched from SL-1 to SL-3 and integrates a state of charge of the secondary battery 21 after the output is switched from SL-1 to SL-3. At the same time, the power-supply controlling means 30 controls the output of the secondary battery 21 to be equal to or smaller than the set SL-3.

The processing proceeds to STEP 9. The power-supply controlling means 30 judges whether the counted elapsed time reaches T3 set in STEP 7 or whether a residual state of charge of the secondary battery 21 reaches the lower limit state of charge. The power-supply controlling means 30 may judge whether the output voltage of the secondary battery 21 reaches a lower limit voltage instead of judging whether the residual state of charge of the secondary battery 21 reaches the lower limit voltage. When a judgment result in STEP 9 is NO, the output of the secondary battery 21 at the output limit value equal to or smaller than SL-3 is performed until the judgment result in STEP 9 changes to YES.

When the judgment result in STEP 9 is YES, the processing proceeds to STEP 10. The power-supply controlling means 30 resets the output limit value of the secondary battery 21 to SL-1.

The processing for switching the output limit value is explained above.

Subsequently, the power-supply controlling means 30 repeatedly executes the flowchart shown in FIG. 4 and controls operation of the VBU 3 and the VCU 20 according to the switching of the output limit value of the secondary battery 21.

First, in STEP 21, the power-supply controlling means 30 judges whether the necessary power P0 is larger than the actual output P. When a judgment result in STEP 21 is NO (the necessary power P0 is equal to or smaller than the actual output P), the processing proceeds to STEP 27. The output limit value is maintained at SL-1 and appropriately controlled such that output voltage set on the basis of the necessary power P0 is supplied from the VBU 3 and VCU 20. One cycle of control processing for the VBU 3 and the VCU 20 corresponding to the switching of the output limit value is finished.

When a judgment result in STEP 21 is YES (the necessary power P0 is larger than the actual output P), the processing proceeds to STEP 22. The power-supply controlling means 30 judges whether the output limit value of the secondary battery 21 is switched from SL-1 to SL-3 by the power-supply controlling means 30.

When a judgment result in STEP 2 is NO (SL-1 is not switched to SL-3), the output of the fuel cell 1 still has a margin and the output limit value is maintained at SL-1. Therefore, it is unnecessary to increase the output limit value of the secondary battery 21 to SL-3. Therefore, in this case, the processing proceeds to STEP 27. The output limit value is appropriately controlled such that output value set on the basis of the necessary power P0 is supplied from the VBU 3 and the VCU 20. One cycle of the control processing for the VBU 3 and the VCU 20 corresponding to the switching of the output limit value is finished.

When the judgment result in STEP 22 is YES (the output is switched from SL-1 to SL-3), the processing proceeds to STEP 23. The power-supply controlling means 30 sets output currents of the VBU 3 and VCU 20 on the basis of the necessary power P0.

In STEP 24, the power-supply controlling means 30 increases a step-up ratio of the VCU 20 to increase the output voltage of the VCU 20 and reduces a step-up ratio of the VBU 3 to reduce the output value of the VBU 3. This makes it possible to balance the output voltages of the VCU 20 and the VBU 3 and control the output power of the VCU 20 to increase to the second output limit value.

In STEP 25, the power-supply controlling means 30 judges whether elapsed time after the output is switched form SL-1 to SL-3 reaches T3 or whether the residual state of charge of the secondary battery 21 reaches the lower limit state of charge. When a judgment result in STEP 25 is NO, the processing returns to STEP 23 and the processing in STEPS 23 to 25 is repeated.

When the judgment result in STEP 25 is YES, the processing proceeds to STEP 26. The power-supply controlling means 30 reduces the step-up ratio of the VCU 20 to reduce the output voltage of the VCU 20 and decreases the step-up ratio of the VBU 3 to increase the VBU 3. This makes it possible to balance output voltages of the VCU 20 and the VBU 3 and control the output power of the VCU 20 to decrease to SL-1.

The control processing for the VBU 3 and the VCU 20 corresponding to the switching of the output limit value is explained above.

A change in supply power according to the switching of the output limit value is explained with reference to FIG. 5. FIG. 5 is a graph of changes in the necessary power P0 corresponding to a requested load from the motor 5 ("a" in the figure), the output power of the fuel cell 1 ("b" in the figure), the output power of the secondary battery 21 ("c" in the figure), and the output limit value of the secondary battery 21 ("d" in the figure) at the time when the vehicle accelerates. Electric power [kw] is set on the ordinate and time [sec] is set on the abscissa.

As shown in FIG. 5, electric power is supplied from the fuel cell 1 and the secondary battery 21 at time t0 to t1. The output limit value of the secondary battery 21 is set to SL-1 and the output of the secondary battery 21 is controlled to be equal to or smaller than SL-1. The output power of the secondary battery 21 reaches SL-1 at time t1.

The output voltage of the fuel cell 1 increases at time t1 to t2 and the output voltage of the secondary battery 21 is limited to SL-1. At time t2, the output power of the fuel cell 1 reaches a predetermined level FCmax. Consequently, the output limit value is switched to SL-3 by the power-supply controlling means 30.

At time t2 to t3, the output power of the fuel cell 1 is maintained at FCmax and the output power of the secondary battery 21 is controlled to be equal to or smaller than SL-3. Consequently, when large output is requested and the output of the fuel cell 1 is insufficient, the output limit for the secondary battery 21 is relaxed. Therefore, it is possible to maintain output performance applicable to a request from the motor 5 while realizing a reduction in size of the fuel cell 1.

At time t3, time elapsed after the output limit value of the secondary battery 21 is set to SL-3 reaches output time T3 and the output limit value of the secondary battery 21 is reset to SL-1 by the power-supply controlling means 30. In this way, the output of the secondary battery 21 at SL-3 is limited to the output time T3. Therefore, it is possible to limit heat generation of the secondary battery 21 and realize improvement of durability of the secondary battery 21.

At time t3 to t4, the output power of the secondary battery 21 is reduced. At time t4, the output power reaches SL-1. After time t4, the output power is limited to be equal to or smaller than SL-1.

When large output is requested, for example, during acceleration of the vehicle, if it is judged that the output of the fuel cell 1 reaches the predetermined level by the processing for switching the output limit value explained above, within the second output time in which continuous output is allowed, electric power is supplied from the secondary battery 21 such that the output is reduced to be equal to or smaller than the second output limit value (the range LU2 shown in FIG. 2) larger than the first output limit value of the secondary battery 21 (the range LU1 shown in FIG. 2).

Therefore, it is possible to supplement the output of the fuel cell 1 with larger output and reduce time until the output reaches the necessary output P0 and improve acceleration performance without deteriorating durability of the secondary battery 21 because of heat generation. The secondary battery 21 only has to have capacity enough for coping with an increase in output in short time. Therefore, it is possible to suppress an increase in the volume of the secondary battery 21.

(2) Input Limit for the Secondary Battery

Processing for switching an input limit value of the secondary battery 21 in the fuel cell power supply device according to this embodiment is explained with reference to a flowchart shown in FIG. 6. The processing is performed in charging the secondary battery 21 when the vehicle decelerates or stops. The processing is sequentially executed periodically at predetermined timing. In the following explanation, it is assumed that, as an initial state, the input limit value of the secondary battery 21 is set to the first input limit value (CL-1 in the input and output limit map shown in FIG. 2). Input time at CL-1 is T1. Charging by regenerated power during deceleration of the vehicle is explained as an example below.

First, at STEP 31, the charging executing means 32 judges whether the torque of the motor 5 is smaller than 0. When the torque of the motor 5 is smaller than 0, the vehicle is decelerating. It is detected by the judgment that the vehicle is in a deceleration state. When a judgment result in STEP 31 is NO (the torque is equal to or larger than 0), the processing proceeds to STEP 39. The input limit value is maintained at CL-1, the input to the secondary battery 21 is controlled to be equal to or smaller than CL-1, and the processing for switching the input limit value is finished.

When a judgment result in STEP 31 is YES (the torque is smaller than 0), the processing proceeds to STEP 32. The charging executing means 32 judges whether regenerated power is equal to or larger than a predetermined value. Consequently, it is judged that the regenerated power of the motor 5 is large like regenerated power generated when the vehicle suddenly decelerates. When the judgment result in STEP 32 is NO (the regenerated power is smaller than the predetermined value), the processing proceeds to STEP 39. The input limit value is maintained at CL-1, the input to the secondary battery 21 is controlled to be equal to or smaller than CL-1, and the processing for switching the input limit value is finished.

When the judgment result in STEP 32 is YES (the regenerated power is equal to or larger than the predetermined value), the processing proceeds to STEP 33. The state-of-charge judging means 33 judges whether the state of charge of the secondary battery 21 is equal to or lower than a predetermined lower limit level. When a judgment result in STEP 33 is NO (the state of charge is not equal to or lower than the predetermined lower limit value), the processing proceeds to STEP 39. The input limit value is maintained at CL-1, the input of the secondary battery 21 is controlled to be equal to or smaller than CL-1, and the processing for switching the input control value is finished.

When the judgment result in STEP 33 is YES (the state of charge is equal to or lower than the predetermined lower limit level), the processing proceeds to STEP 34. The power-supply controlling means 30 switches the input limit value of the secondary battery 21 to CL-3 (the second input limit value) in the input and output limit map shown in FIG. 2.

In STEP 35, the charge executing means 32 sets, with reference to the input and output limit map, input time T3 for allowing input (charging) at CL-3 set in STEP 34. The charging executing means 32 corrects T3 on the basis of the temperature of the secondary battery 21 such that, for example, input time is shorter as the present temperature is higher than reference temperature set in advance.

The charging executing means 32 may sequentially calculate the input time T3 from the temperature of the secondary battery 21, upper limit temperature corresponding to a range for not spoiling durability of the secondary battery 21, and a heat generation predicted amount in continuous input at CL-3 set in STEP 34.

The processing proceeds to STEP 36. The charging executing means 32 counts elapsed time after the input is switched from CL-1 to CL-3 and integrates a state of charge of the secondary battery 21 after the input is switched from CL-1 to CL-3. At the same time, the charging executing means 32 charges the secondary battery 21 such that the input to the secondary battery 21 is equal to or smaller than the set CL-3.

The processing proceeds to STEP 37. The charging executing means 32 judges whether the counted elapsed time reaches T3 set in STEP 35 or whether the state of charge of the secondary battery 21 reaches an upper limit state of charge. When a judgment result in STEP 37 is NO, the charging of the secondary battery 21 at CL-3 is performed until the judgment result in STEP 37 changes to YES.

When the judgment result in STEP 37 is YES, the processing proceeds to STEP 38. The charging executing means 32 resets the input limit value of the secondary battery 21 to CL-1.

The processing for switching the input limit value is explained above. When the state of charge of the secondary battery 21 is substantially reduced by the processing for switching the input limit value like a state of charge after acceleration of the vehicle, the charging of the secondary battery 21 is executed within second input time in which continuous input is allowed such that the input to the secondary battery 21 is equal to or smaller than the second input limit value (the range LL2 shown in FIG. 2) larger than the first input limit value (the range LL1 shown in FIG. 2). Therefore, it is possible to relax the input limit for the secondary battery 21 and prepare for an increase in power supply to the motor 5 after that without deteriorating durability of the secondary battery 21 because of heat generation.

In the explanation of this embodiment, the fuel cell power supply device according to the present invention is provided as the driving source for the vehicle. However, the present invention can be applied to any fuel cell power supply device as long as the output power of a fuel cell is supplied to an electric load.

In this embodiment, the lithium ion battery is used as the secondary battery according to the present invention and the electric double layer capacitor is used as the capacitor according to the present invention. However, specifications of the secondary battery and the capacitor according to the present invention are not limited to the above. A secondary battery and a capacitor of other specifications may be used.

In this embodiment, the DC/DC converter of the bidirectional step-up and step-down type is used as the second step-up and step-down means (the VCU) 20. However, a DC/DC converter of a bidirectional step-down/step-up type may be used. When the DC/DC converter of the bidirectional step-down/step-up type is used, in STEP 24 explained above, the power-supply controlling means 30 reduces the step-down ratio of the VCU 20 and reduces the step-up ratio of the VBU 3. This makes it possible to balance output voltages of the VCU 20 and the VBU 3 and control the output power from the VCU 20 to quickly increase to the first output limit value.

In STEP 26, the power-supply controlling means 30 increases the step-down ratio of the VCU 20 and increases the step-up ratio of the VBU 3. This makes it possible to balance output voltages of the VCU 20 and the VBU 3 and control the output power from the VCU 20 to quickly decrease to the first output limit value.

In this embodiment, the motor 5 is used as the load according to the present invention. However, the load according to the present invention may be the auxiliary 22 of the fuel cell 1, electric devices such as air conditioning equipment and audio devices provided in the vehicle, and a battery. The auxiliary 22 of the fuel cell 1 includes a pump that supplies the air as a reactive gas to the fuel cell 1, a humidifier for retaining moisture of an electrolytic film of the fuel cell 1, and a water cooling circulation pump for a radiator of the fuel cell 1. However, when these devices are used, the charging executing means 32 does not have the first charging for charging the capacitor 3 and the second charging for charging the secondary battery 21 using regenerated power.

Second Embodiment

Figure 7:
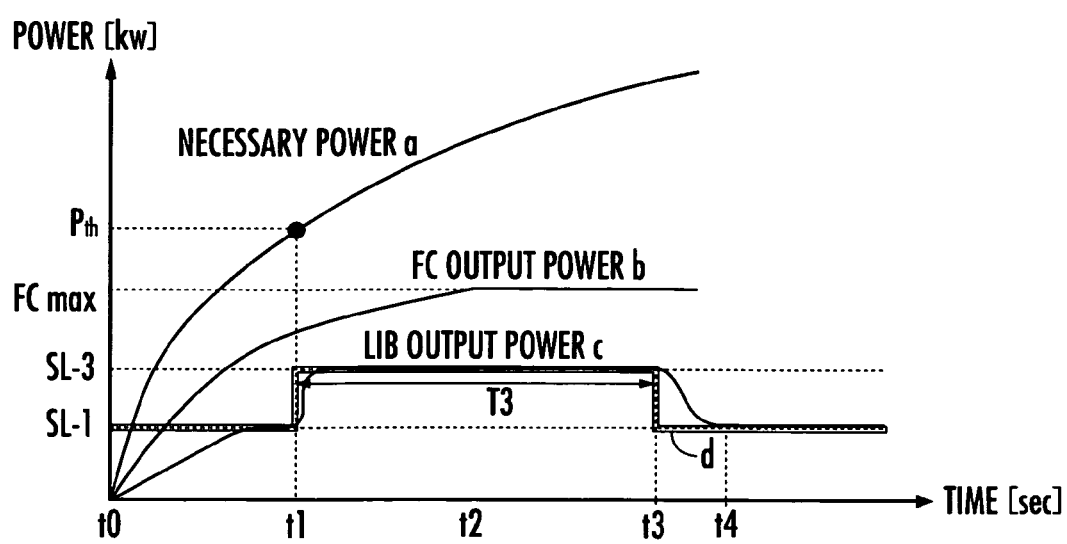
FIG. 7 is a graph of a temporal change in power supply by a fuel cell power supply device according to a second embodiment of the present invention.
Figure 8:
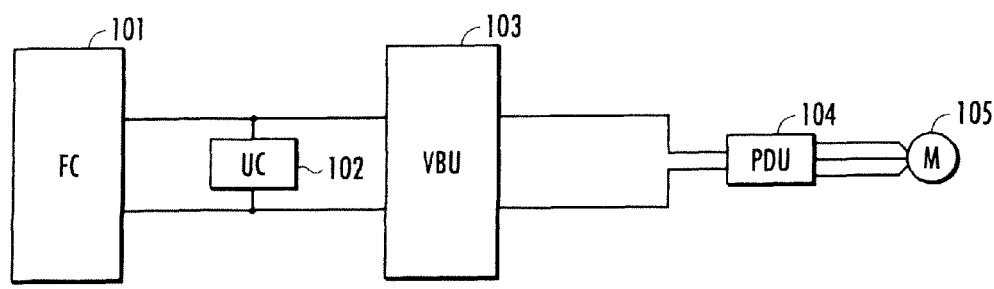
FIG. 8 is a diagram of a first conventional fuel cell power supply device.
Figure 9:
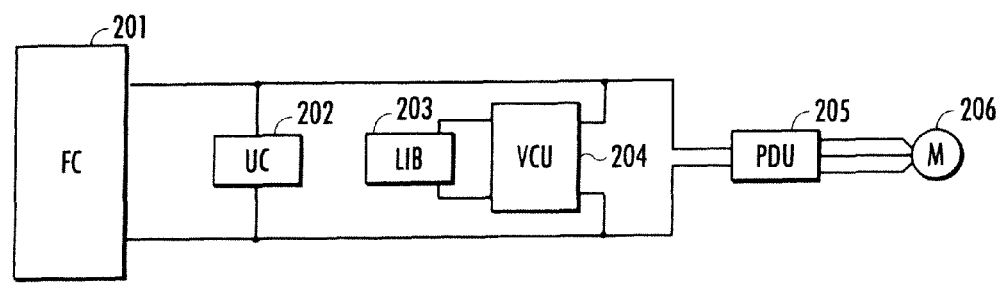
FIG. 9 is a diagram of a second conventional fuel cell power supply device.

A second embodiment of the present invention is explained below with reference to FIG. 7. FIG. 7 is a graph of a temporal change in power supply in power supply control processing by the fuel cell power supply device according to the second embodiment. This embodiment is different from the first embodiment only in a condition for judgment by the output judging means 31. In the following explanation, components same as those in the first embodiment are denoted by the same reference numerals and signs and explanation of the components is omitted.

In this embodiment, the output judging means 31 judges whether electric power requested by the motor 5 (the necessary power P0) is equal to or higher than a predetermined level (STEP 4 shown in FIG. 3). The power-supply controlling means 30 switches the output limit value of the secondary battery 21 on the basis of a judgment result in STEP 4. Other operations are the same as those in the first embodiment.

A temporal change in power supply by processing for switching an output limit value according to this embodiment is explained with reference to FIG. 7. Like FIG. 5, FIG. 7 is a graph of changes in the necessary power P0 corresponding to a requested load from the motor 5 ("a" in the figure), the output power of the fuel cell 1 ("b" in the figure), the output power of the secondary battery 21 ("c" in the figure), and the output limit value of the secondary battery 21 ("d" in the figure) at the time when the vehicle accelerates. Electric power [kw] is set on the ordinate and time [sec] is set on the abscissa.

As shown in FIG. 7, electric power is supplied from the fuel cell 1 and the secondary battery 21 at time t0 to t1. The output limit value of the secondary battery 21 is set to the first output limit value SL-1 and the output of the secondary battery 21 is controlled to be equal to or smaller than SL-1. The necessary power P0 reaches a predetermined level Pth at time t1. Consequently, the output limit value of the secondary battery 21 is switched to the second output limit value SL-3 by the power-supply controlling means 30. At time t1 to t2, the output voltage of the fuel cell 1 is increased and the output voltage of the secondary battery 21 is controlled to be equal to or smaller than SL-3.

At time t2, the output power of the fuel cell 1 reaches the predetermined level FCmax. At time t2 to t3, the output power of the fuel cell 1 is maintained at FCmax and the output power of the secondary battery 21 is controlled to be equal to or smaller than SL-3. Consequently, when large output is requested and the output of the fuel cell 1 is insufficient, the output limit for the secondary battery 21 is relaxed. Therefore, it is possible to maintain output performance applicable to a request from the motor 5 while realizing a reduction in size of the fuel cell 1.

At time t3, time elapsed after the output limit value of the secondary battery 21 is set to SL-3 reaches output time T3 and the output limit value of the secondary battery 21 is set to SL-1 by the power-supply controlling means 30. In this way, the output voltage of the secondary battery 21 is reduced and reaches SL-1 at time t4. After time t4, the output voltage of the secondary battery 21 is limited to be equal to or smaller than SL-1. Since the output of the secondary battery 21 at SL-3 is limited to the output time T3, it is possible to limit heat generation of the secondary battery 21 and realize improvement of durability of the secondary battery 21.

According to this embodiment, as in the first embodiment, it is possible to supplement the output of the fuel cell 1 with larger output and reduce time until the output reaches the necessary output P0 to improve acceleration performance without deteriorating durability of the secondary battery 21 because of heat generation. The secondary battery 21 only has to have capacity enough for coping with an increase in output in short time. Therefore, it is possible to suppress an increase in the volume of the secondary battery 21.

According to this embodiment, since the output limit value of the secondary battery 21 is switched on the basis of the necessary power P0 requested by the motor 5, it is possible to quickly cope with an increase in the necessary power P0 and relax the output limit of the secondary battery 21 without being affected by a delay of the fuel cell 1 in following a change in the necessary power P0 and prevent shortage of output to the motor 5.

In this embodiment, the output judging means 31 judges whether electric power requested by the motor 5 is equal to or higher than the predetermined level. However, as another embodiment, the output judging means 31 may judge whether a rate of rise in electric power requested by the motor (the necessary power P0) is equal to or higher than a predetermined level. In this case, it is possible to prevent shortage of output to the motor 5 due to the delay of an increase in output of the fuel cell 1 in following an increase in the necessary power P0 by relaxing the output limit of the secondary battery 21 according to a sudden increase in the necessary power P0.

What is claimed is:

1. A fuel cell power supply device comprising:
    a fuel cell;
    an accumulating means;
    a first step-up and step-down means comprising an input section connected to the fuel cell and an output section connected to a load, the first step-up and step-down means steps up or steps down voltage inputted to the input section and supplies electric power generated by the stepped-up or stepped-down voltage to the load;
    a second step-up and step-down means comprising an input section connected to the first step-up and step-down means and an output section connected to the accumulating means, the second step-up and step-down means steps up or steps down voltage inputted to the input section and supplies electric power generated by the stepped-up or stepped-down voltage to the load; and
    a power-supply controlling means for controlling operation of the first and second step-up and step-down means according to electric power requested by the load and controlling power supply from the fuel cell to the load and power supply from the accumulating means to the load, wherein
    the fuel cell power supply device includes an output judging means for judging whether an output of the fuel cell is equal to or higher than a predetermined level, and
    the power-supply controlling means limits, when it is not judged by the output judging means that the output of the fuel cell is equal to or higher than the predetermined level, an output of the accumulating means to be equal to or smaller than a first output limit value for allowing continuous output in first output time and limits, when it is judged by the output judging means that the output of the fuel cell is equal to or higher than the predetermined level, within second output time shorter than the first output time, the output of the accumulating means to be equal to or smaller than a second output limit value, which is larger than the first output limit value, for allowing continuous output in the second output time.

2. The fuel cell power supply device according to claim 1, wherein the accumulating means is a secondary battery.

3. The fuel cell power supply device according to claim 1, wherein the fuel cell power supply device is mounted on a vehicle and the load is a motor serving as a power source for the vehicle.

4. The fuel cell power supply device according to claim 3, wherein
    the motor is coupled to an axle of the vehicle and operates as a generator to output regenerated power during deceleration of the vehicle,
    the fuel cell power supply device includes:
    a capacitor connected in parallel to the fuel cell; and
    a charging executing means for controlling the operation of the first and second step-up and step-down means and executing first charging for supplying the regenerated power to the capacitor via the first step-up and step-down means and second charging for supplying the regenerated power to the accumulating means via the second step-up and step-down means, and
    the charging executing means charges, when the power supply controlling means limits the output of the accumulating means to be equal to or smaller than the second limit value and performs power supply from the accumulating means to the load, after the power supply is finished, the accumulating means to a predetermined upper limit level using the second charging and then executes the first charging.

5. The fuel cell power supply device according to claim 4, further comprising a state-of-charge judging means for judging whether a state of charge of the accumulating means is equal to or lower than a predetermined lower limit level, wherein
    the charging executing means limits, when it is not judged by the state-of-charge judging means that the state of charge of the accumulating means is equal to or lower than the predetermined lower limit level, the input to the accumulating means to be equal to or smaller than a first input limit value for allowing continuous input in first input time and limits, when it is judged by the state-of-charge judging means that the state of charge of the accumulating means is equal to or lower than the predetermined lower limit level, within second input time shorter than the first input time, the input to the accumulating means to be equal to or smaller than a second input limit value, which is larger than the first input limit value, for allowing continuous input in the second input time.

6. A fuel cell power supply device comprising:
    a fuel cell;
    an accumulating means;
    a first step-up and step-down means comprising an input section connected to the fuel cell and an output section connected to a load, the first step-up and step-down means stepping up or stepping down voltage inputted to the input section and supplying electric power generated by the stepped-up or stepped-down voltage to the load;
    a second step-up and step-down means comprising an input section connected to the first step-up and step-down means and an output section connected to the accumulating means, the second step-up and step-down means stepping up or stepping down voltage inputted to the input section and supplying electric power generated by the stepped-up or stepped-down voltage to the load; and a power-supply controlling means for controlling operation of the first and second step-up and step-down means according to electric power requested by the load and controlling power supply from the fuel cell to the load and power supply from the accumulating means to the load, wherein the fuel cell power supply device includes an output judging means for judging whether electric power requested by the load is equal to or higher than a predetermined level, and the power supply controlling means limits, when it is not judged by the output judging means that the requested electric power is equal to or higher than the predetermined level, an output of the accumulating means to be equal to or smaller than a first output limit value for allowing continuous output in first output time and limits, when it is judged by the output judging means that the requested electric power is equal to or higher than the predetermined level, within second output time shorter than the first output time, the output of the accumulating means to be equal to or smaller than a second output limit value, which is larger than the first output limit value, for allowing continuous output in the second output time.

7. The fuel cell power supply device according to claim 6, wherein the accumulating means is a secondary battery.

8. The fuel cell power supply device according to claim 6, wherein the fuel cell power supply device is mounted on a vehicle and the load is a motor serving as a power source for the vehicle.

9. The fuel cell power supply device according to claim 8, wherein the motor is coupled to an axle of the vehicle and operates as a generator to output regenerated power during deceleration of the vehicle, the fuel cell power supply device includes:

a capacitor connected in parallel to the fuel cell; and a charging executing means for controlling the operation of the first and second step-up and step-down means and executing first charging for supplying the regenerated power to the capacitor via the first step-up and step-down means and second charging for supplying the regenerated power to the accumulating means via the second step-up and step-down means, and the charging executing means charges, when the power supply controlling means limits the output of the accumulating means to be equal to or smaller than the second limit value and performs power supply from the accumulating means to the load, after the power supply is finished, the accumulating means to a predetermined upper limit level using the second charging and then executes the first charging.

10. The fuel cell power supply device according to claim 9, further comprising a state-of-charge judging means for judging whether a state of charge of the accumulating means is equal to or lower than a predetermined lower limit level, wherein the charging executing means limits, when it is not judged by the state-of-charge judging means that the state of charge of the accumulating means is equal to or lower than the predetermined lower limit level, the input to the accumulating means to be equal to or smaller than a first input limit value for allowing continuous input in first input time and limits, when it is judged by the state-of-charge judging means that the state of charge of the accumulating means is equal to or lower than the predetermined lower limit level, within second input time shorter than the first input time, the input to the accumulating means to be equal to or smaller than a second input limit value, which is larger than the first input limit value, for allowing continuous input in the second input time.

11. A fuel cell power supply device comprising:

a fuel cell;

an accumulating means;

a first step-up and step-down means comprising an input section connected to the fuel cell and an output section connected to a load, the first step-up and step-down means steps up or steps down voltage inputted to the input section and supplies electric power generated by the stepped-up or stepped-down voltage to the load;

a second step-up and step-down means comprising an input section connected to the first step-up and step-down means and an output section connected to the accumulating means, the second step-up and step-down means steps up or steps down voltage inputted to the input section and supplies electric power generated by the stepped-up or stepped-down voltage to the load; and a power-supply controlling means for controlling operation of the first and second step-up and step-down means according to electric power requested by the load and controlling power supply from the fuel cell to the load and power supply from the accumulating means to the load, wherein the fuel cell power supply device includes an output judging means for judging whether a rate of rise of electric power requested by the load is equal to or higher than a predetermined level, and the power supply controlling means limits, when it is not judged by the output judging means that the rate of rise of the requested electric power is equal to or higher than the predetermined level, an output of the accumulating means to be equal to or smaller than a first output limit value for allowing continuous output in first output time and limits, when it is judged by the output judging means that the rate of rise of the requested electric power is equal to or higher than the predetermined level, within second output time shorter than the first output time, the output of the accumulating means to be equal to or smaller than a second output limit value, which is larger than the first output limit value, for allowing continuous output in the second output time.

12. The fuel cell power supply device according to claim 11, wherein the accumulating means is a secondary battery.

13. The fuel cell power supply device according to claim 11, wherein the fuel cell power supply device is mounted on a vehicle and the load is a motor serving as a power source for the vehicle.

14. The fuel cell power supply device according to claim 13, wherein the motor is coupled to an axle of the vehicle and operates as a generator to output regenerated power during deceleration of the vehicle, the fuel cell power supply device includes:

a capacitor connected in parallel to the fuel cell; and a charging executing means for controlling the operation of the first and second step-up and step-down means and executing first charging for supplying the regenerated power to the capacitor via the first step-up and step-down means and second charging for supplying the regenerated power to the accumulating means via the second step-up and step-down means, and the charging executing means charges, when the power supply controlling means limits the output of the accumulating means to be equal to or smaller than the second limit value and performs power supply from the accumulating means to the load, after the power supply is finished, the accumulating means to a predetermined upper limit level using the second charging and then executes the first charging.

15. The fuel cell power supply device according to claim 14, further comprising a state-of-charge judging means for judging whether a state of charge of the accumulating means is equal to or lower than a predetermined lower limit level, wherein the charging executing means limits, when it is not judged by the state-of-charge judging means that the state of charge of the accumulating means is equal to or lower than the predetermined lower limit level, the input to the accumulating means to be equal to or smaller than a first input limit value for allowing continuous input in first input time and limits, when it is judged by the state-of-charge judging means that the state of charge of the accumulating means is equal to or lower than the predetermined lower limit level, within second input time shorter than the first input time, the input to the accumulating means to be equal to or smaller than a second input limit value, which is larger than the first input limit value, for allowing continuous input in the second input time.

* * * * *